US011816912B1

(12) United States Patent
Margolin et al.

(10) Patent No.: US 11,816,912 B1
(45) Date of Patent: Nov. 14, 2023

(54) EXTRACTING STRUCTURAL INFORMATION USING MACHINE LEARNING

(71) Applicant: INTUIT INC., Mountain View, CA (US)

(72) Inventors: Itay Margolin, Petah Tikva (IL); Liran Dreval, Tel Aviv (IL)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/326,735

(22) Filed: May 31, 2023

(51) Int. Cl.
    *G06V 30/414*      (2022.01)
    *G06V 10/77*      (2022.01)

(52) U.S. Cl.
    CPC ........ *G06V 30/414* (2022.01); *G06V 10/7715* (2022.01)

(58) Field of Classification Search
    CPC .......................... G06V 30/414; G06V 10/7715
    See application file for complete search history.

(56) References Cited

U.S. PATENT DOCUMENTS

| | | | | |
|---|---|---|---|---|
| 11,727,062 B1 * | 8/2023 | Gaskell | ............... | G06F 16/9024 707/798 |
| 2023/0154221 A1 * | 5/2023 | Gu | ......... | G06N 3/044 382/156 |
| 2023/0230269 A1 * | 7/2023 | Yoo | ......... | G06T 7/246 382/106 |
| 2023/0237093 A1 * | 7/2023 | Li | ............ | G06N 3/08 707/734 |

* cited by examiner

*Primary Examiner* — Dhaval V Patel
(74) *Attorney, Agent, or Firm* — Patterson + Sheridan, LLP (57) ABSTRACT

The present disclosure provides techniques for extracting structural information using machine learning. One example method includes receiving electronic data indicating one or more pages, constructing, for each page of the one or more pages, a tree based on the page, wherein each level of the tree includes one or more nodes corresponding to elements in a level of elements in the page, encoding, for each page of the one or more pages, a value of each node of the tree for the page into a vector using a first machine learning model, sampling a plurality of pairs of vectors from the one or more trees for the one or more pages, wherein a given pair of vectors corresponds to values of nodes in a same tree, training a second machine learning model using the plurality of pairs, and combining each vector with weights of the second machine learning model.

20 Claims, 4 Drawing Sheets

EXTRACTING STRUCTURAL INFORMATION USING MACHINE LEARNING

INTRODUCTION

Aspects of the present disclosure relate to extracting information from documents using machine learning.

In many software applications, data in a document is organized using various structures or hierarchies. The structural information (e.g., the organization or the hierarchy) of the document often contains valuable insights and can help expedite analysis of the data by identifying elements of interest. For example, a webpage written in HTML (HyperText Markup Language) includes elements that denote data (e.g., texts, pictures, and so on). Elements in a document can be organized using different levels (e.g., divisions, headers, paragraphs, and so on).

However, existing techniques for analyzing data in a document do not generally consider the relationships between elements of the document. For example, existing classification techniques often consider elements of the document in isolation. Even when machine learning models such as language models are used to analyze documents, existing language models analyze a document as a whole, without considering the structure of the document. Accordingly, existing methods often result in inefficiency and waste of computational resources during analysis of the data.

Accordingly, improved systems and methods are needed for extracting information from documents.

BRIEF SUMMARY

Certain embodiments provide a method for extracting structural information using machine learning. The method generally includes receiving electronic data indicating one or more pages, constructing, for each page of the one or more pages, a tree based on the page, wherein each level of the tree includes one or more nodes corresponding to elements in a level of elements in the page, encoding, for each page of the one or more pages, a value of each node of the tree for the page into a vector using a first machine learning model, sampling a plurality of pairs of vectors from the one or more trees for the one or more pages, wherein a given pair of vectors corresponds to values of nodes in a same tree, training a second machine learning model using the plurality of pairs of vectors, and combining each vector with weights of the second machine learning model.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of the various embodiments.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for extracting structural information using machine learning.

Existing methods for analyzing data in a document often ignore the structural information (e.g., the organization or the hierarchy) of the data. For example, classifiers such as Deepwalk and Node2Vec often ignore the relationships between elements in a document. Similarly, existing language models consider a document as a whole, without first recognizing elements or structure of the document.

While conventional computer-based techniques for analyzing data in a document do not utilize the structural information of the document, embodiments of the present disclosure utilize machine learning techniques to extract structural information of the document to aid the data analysis process.

In general, documents that correspond to a particular type are organized in similar frameworks. For example, many webpages are written in hypertext markup language (HTML), which denotes a similar structure shared by the webpages. Graph representations can be constructed for the documents, where each node in the graph represents an element of the document. Many documents are organized with different elements and levels of elements (e.g., paragraphs, indentations, points, divisions, fields and so on). A node can have a daughter node if the corresponding element has a sub-element. The nodes closer to the root are known as higher level nodes while the nodes farther away from the root are known as lower level nodes. In general, webpages can be represented using trees, as webpages are usually acyclic.

Machine learning techniques, such as natural language processing (NLP) methods, can be used to encode the data indicated in a node. For example, a first machine learning model, such as Bidirectional Encoder Representations from Transformers (BERT), Generative Pre-Trained Transformer (GPT), or Seq2Seq, can be used to translate data, such as text blobs, into vectors. By encoding data indicated in a node as a vector, techniques described herein allow the data to be represented in a compact manner and help analyze the data efficiently.

To explore the structures of documents, random walks can be performed on the graph representation of each document to generate a plurality of training samples. A random walk can start at a given node in a graph and end at another node in the same graph. Pairs of vectors corresponding to the start node and the end node can be used as training samples. For example, the vector representation of the start node of a random walk can be designated as the training input of a training sample whereas the vector representation of the end node of the random walk can be designated as the label of the training sample. By including multiple pairs in one document and across multiple documents, the training samples represent the structural information common to all the documents (e.g., of a given type).

The pairs of vectors sampled through the random walks performed on the graphs can be used to train a second machine learning model. The second machine learning model can learn the common structures in the documents. For example, during training, the parameters (e.g., weights) of the second machine learning model can be updated so as to minimize the difference between its input (e.g., a start node vector as the training input) and its desired output (e.g., the end node vector as the label). After training, the parameters of the second machine learning model encode the common structure of the documents.

The parameters, such as the weights, can be combined with (e.g., used to generate a dot product with or concatenated with) the start node vectors or the end node vectors, respectively. A combined vector can represent both the encoded information about the corresponding node and its structural position in the document. The combined vectors can be used to perform downstream machine learning tasks, such as analysis of an element with respect to its structural position in the document. For example, a data scraping task for scraping transactions from a website can benefit from knowing that elements under a "transaction" tab are more relevant than elements under a "transaction codes" section of a "help" tab.

Accordingly, by including a plurality pairs in one document and across a plurality of documents, the training samples effectively represent the structural information common to all the documents. The random walks used to sample training samples ensure varied representations of elements in the documents. As a result, techniques described herein allow accurate and fast automated extraction of structural information included in the documents. In addition, combining the vector encodings of nodes with the structural information extracted as described herein helps downstream machine learning tasks by emphasizing the structural position of a node in a document and identifying the nodes relevant to a given task, thereby reducing processing time and necessary computational resources.

Example Extractor for Extracting Structural Information Using Machine Learning

Figure 1:
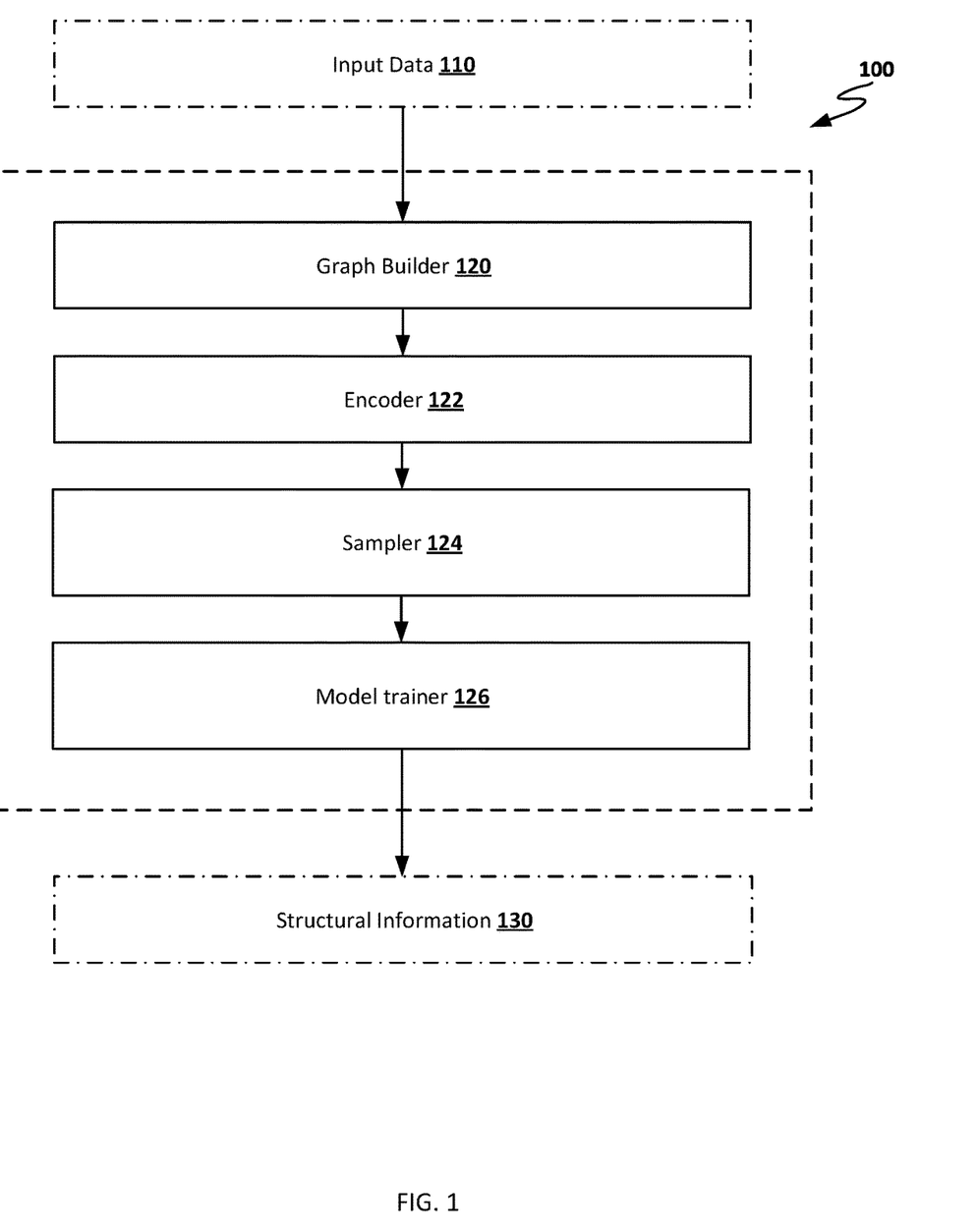
FIG. 1 depicts an example extractor for extracting structural information using machine learning.

FIG. 1 depicts an example extractor 100 for extracting structural information from documents using machine learning. Although discussed with respect to extracting structural information from pages, extractor 100 can extract structural information from other types of documents.

Extractor 100 receives input data 110 as inputs and generates structural information 130 as output. Input data 110 can include one or more pages (e.g., webpages). The pages can have similar formats and/or may otherwise be organized using the same data structure, such as using HTML.

Input data 110 is provided to graph builder 120 to generate graphs. Each page in input data 110 can be used to generate a graph representation of the page. Pages are usually organized using elements. For example, an HTML page has a header and a body, and the header and the body can include sub-elements (e.g., divisions and paragraphs). Each division can also have subdivisions. For simplicity, the following discussion assumes that the pages are HTML files, though the pages can be written in other languages or organized using other types of data structures.

Accordingly, graph builder 120 can create a node for an element (e.g., the body) and a daughter node for each sub-element of the element (e.g., each division in the body). A node can indicate the data (e.g., text blob, pictures, and so on) in the element. In an example, the divisions in the body of a page are represented with daughter nodes of the body node, and each division node has daughter division nodes if the division includes subdivisions. Conversely, the body node is known as the parent node of the division nodes. In the example, the root of a graph is the HTML (e.g., indicated by the <html> and </html> tags). The nodes closer to the root are known as higher level nodes while the nodes farther away from the root are known as lower level nodes. Following the example, the body node is considered a higher level node whereas the division nodes are considered lower level nodes.

In general, the graph of a page (e.g., a webpage) is a tree, as a page is usually acyclic. Following the example above, a lower level node (e.g., a division node) does not have a higher level node (e.g., a body node) as a daughter node. In some examples, the level of an element in a document inversely corresponds to the depth of the element in the tree, such that the higher the level of an element, the smaller the depth of the element. Details regarding a graph representation of a page can be found below with respect to FIG. 2.

Graphs can be provided to encoder 122 to encode the data indicated in the nodes of the graphs. Each node in a graph includes data, as discussed above. Encoder 122 can encode the data into a vector using a first machine learning model (e.g., a neural network) to facilitate processing of the data. In some examples, the data is encoded using a transformer-based language model, such as a Bidirectional Encoder Representations from Transformers (BERT) or a Generative Pre-Trained Transformer (GPT), such as GPT-3 or GPT-4. In some examples, alternatively, the data is encoded using a recurrent neural network, such as Seq2Seq. The vector representations of the data from different nodes can have a uniform size, regardless of the size of the data in each node. The uniform size of the vectors represents the data compactly.

Encoded graphs can be provided to sampler 124 to generate training samples. Sampler 124 can use random walks to sample nodes in the graphs and generate pairs of nodes as training samples. Sampler 124 can initialize in a graph a random node as the start node and perform a random walk from the start node. The random walk at a node can move to a parent node or to a daughter node. The start node of the random walk can be paired with the end node of the random walk, with the vector representation of the start node designated as the training input while the vector representation of the end node as the label. In some examples, a plurality of random walks are performed on each graph. This helps include adequate information to represent the structure of any given page in the training samples. Details regarding sampling training samples from graphs can be found below with respect to FIG. 2.

Training samples can be provided to model trainer 126 to train a second machine learning model (e.g., a neural network). As discussed above, the training samples include vector representations of start nodes as training inputs and vector representations of end nodes as labels. The second machine learning model can learn the common structural information of pages from the pairs of vectors. The uniform size of the start node vectors and the end node vectors can facilitate the training of the second machine learning model, as discussed above.

During training, the parameters of the second machine learning model, such as the weights, can be iteratively updated based on the training data, such as through a supervised learning process. For example, training inputs may be provided as inputs to the second machine learning model, and outputs from the second machine learning model in response to the inputs may be compared to the labels associated with the training inputs. Parameters of the second machine learning model may be iteratively updated based on the comparing of the outputs from the model to the labels, such as to optimize an objective function. In one example, the objective function is a cost function that uses mean squared error.

In one example, the parameters of the second machine learning model are updated so as to minimize the difference (e.g., Euclidean distance, Manhattan distance, and/or the like) between the start node vectors and the end node vectors. The second machine learning model can learn the transformation from its input (e.g., the start node vectors) to its desired output (e.g., the end node vectors), where the transformation denotes moving from an element in a page to another element in the page. After training, the parameters of the second machine learning model encode the common structure of all the pages.

In some examples, the parameters of the second machine learning model are used to automatically extract one or more values (e.g., hierarchical information such as levels of elements) from additional electronic data (e.g., new pages).

In some examples, the second machine learning model has a simple architecture for easy extraction of its weights. In such examples, the second machine learning model includes a single hidden layer, such as an autoencoder.

The weights of the second machine learning model can be extracted as structural information 130 of the pages, as discussed above. Structural information 130 can be combined with (e.g., used to generate a dot product with or concatenated to) the start node vectors or the end node vectors, respectively. A combined vector can represent both the encoded information about the corresponding node and its structural position in the document.

The combined vectors can be used to perform downstream machine learning tasks. For example, a downstream machine learning task can include scraping transaction records from a website. Structural information 130 can help the data scraping task to focus more on "transaction" elements rather than "help" elements that may include "transaction codes" information.

Example Graph for Extracting Structural Information Using Machine Learning

Figure 2:
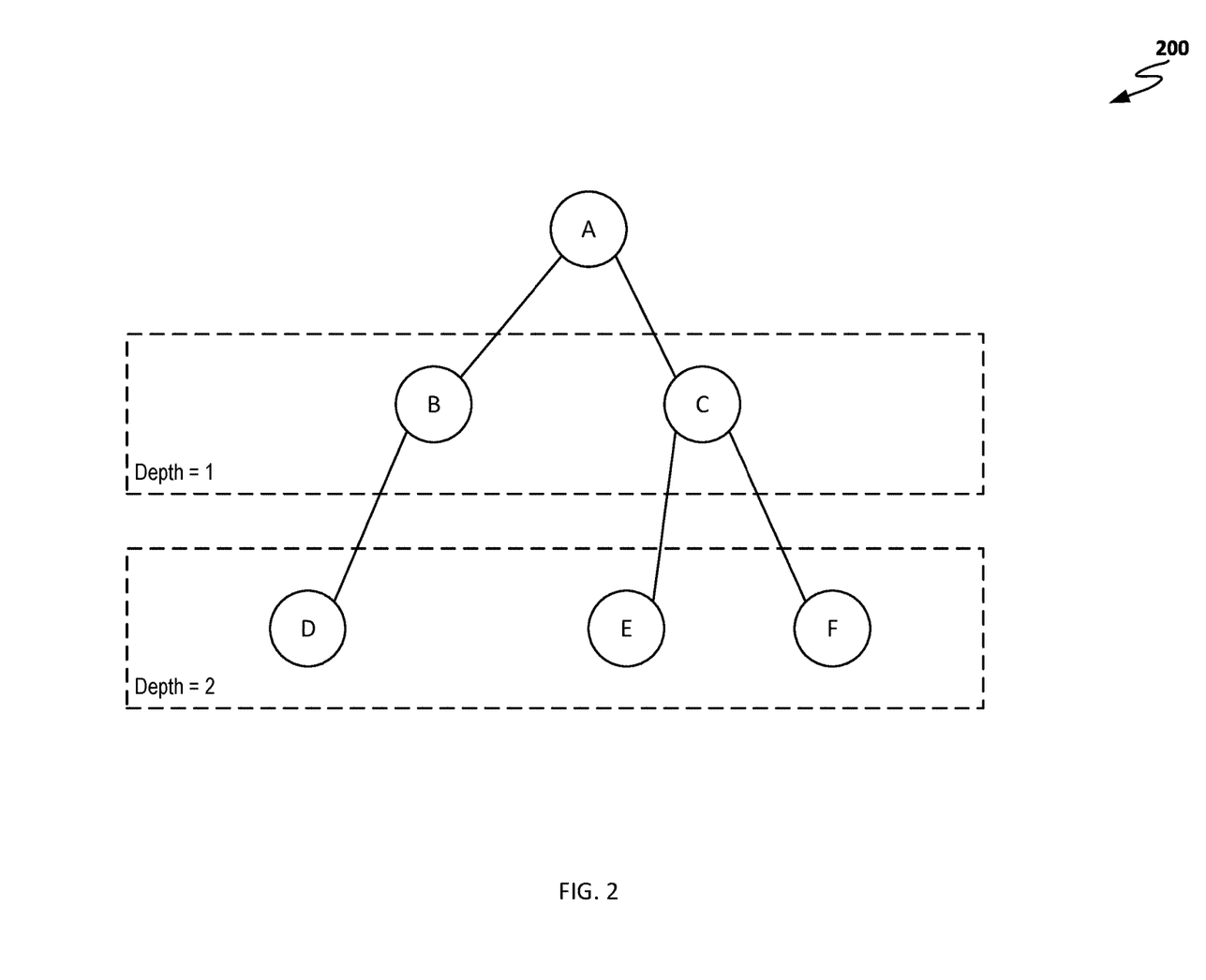
FIG. 2 depicts an example graph for sampling training data.

FIG. 2 depicts an example graph 200 for extracting structural information using machine learning. Although illustrated as the graph representation of a specific document (e.g., a page), graph 200 can be used to represent any suitable document. Although depicted as including a specific number of nodes, graph 200 can include fewer or more nodes, depending on the document it represents.

Graph 200 is a graph representation of a document. In this example, the document is a page (e.g. an HTML file) and graph 200 is a tree. As depicted, there are 6 nodes in graph 200, namely nodes A-H. A graph builder can be used to generate graph 200, such as graph builder 120 as depicted in FIG. 1. An encoder can be used to encode the data indicated in each node of graph 200, such as encoder 122 as depicted in FIG. 1. For simplicity, in the discussion below, the nodes of the graph 200 are assumed to have vector representations of the data indicated in the nodes.

As depicted, graph 200 has 3 levels. Node A is the root of the graph 200 and has a depth of 0 and the highest level in the document. For example, node A can represent an HTML element (e.g., indicated by <html> and </html> tags). As depicted, node A has two daughter nodes, namely node B and node C. Conversely, node A is the parent node of node B and node C. Node B and node C have a depth of 1 and are a level lower than node A. For example, node B can represent a head element (e.g., indicated by <head> and </head> tags) and node C can represent a body element (e.g., indicated by <body> and </body> tags).

As depicted, node B is the parent node of node D and node C is the parent node of node E and node F. Each of node D, node E, and node F has a depth of 2 and is hence one level lower than node B and node C. For example, node D, node E, and node F can represent division elements (e.g., indicated by <div> and </div> tags).

A sampler can be used to sample training samples from the graph. For example, the sampler can be graph builder 120 as depicted in FIG. 1. Random walks can be used to generate training samples from graph 200. Random walks can travel up or down levels or across branches (e.g., from a lower level to the root and then down to a lower level). In other words, a random walk can start at a node in a graph and end at any other node in the graph.

In an example, a random walk starts at node B and ends at node F (e.g., from node B to node A to node C to node F). Accordingly, the vector representation of node B is designated as the training input paired with the representation of node F as the label. The pair can be a training sample used in a model trainer, such as model trainer 126, to train a machine learning model to recognize the structural information in the document.

Figure 3:
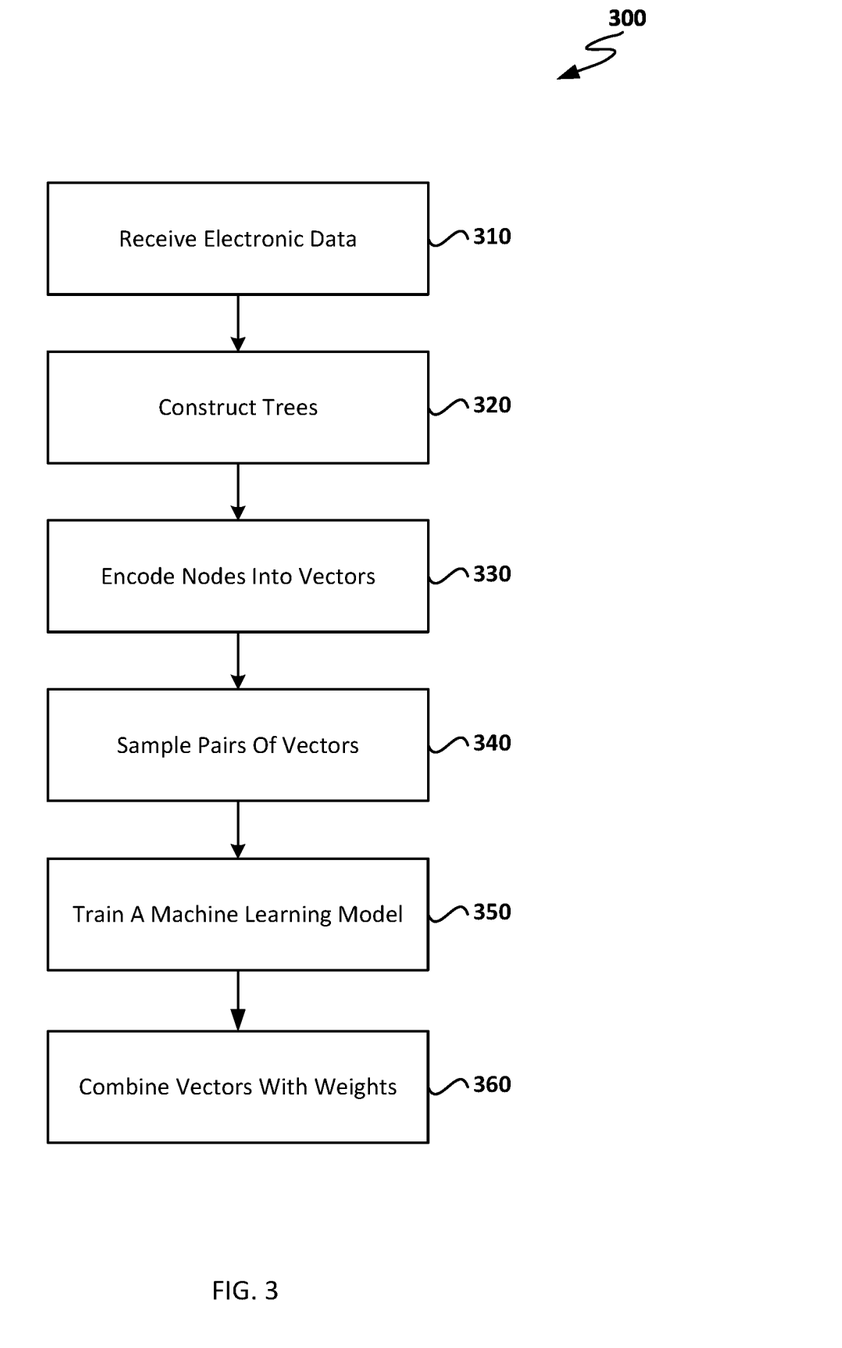
FIG. 3 is a flow diagram of example operations for extracting structural information using machine learning.

Example Operations for Extracting Structural Information Using Machine Learning FIG. 3 is a flow diagram of example operations 300 for extracting structural information using machine learning. Operations 300 may be performed by an extractor, such as extractor 100 as illustrated in FIG. 1.

Operations 300 begin at 310, where electronic data indicating one or more pages is received. For example, the electronic data can be input data 110 illustrated in FIG. 1. Although discussed as pages, electronic data can indicate any suitable type of documents.

In some embodiments, the one or more pages are HTMLs and the level of elements represents a division, a paragraph, or a field of the HTMLs.

At 320, a tree is constructed for each page of the one or more pages based on the page, wherein each level of the tree includes one or more nodes corresponding to elements in a level of elements in the page. For example, the tree can be graph 200 as depicted in FIG. 2, and the tree can be constructed by a graph builder, such as graph builder 120 as depicted in FIG. 1.

In some embodiments, each state of the sequence of states in each training episode is encoded using a neural network. In such embodiments, the neural network includes a convolutional neural network (CNN) or Bidirectional Encoder Representations from Transformers (BERT).

At 330, for each page of the one or more pages, a value of each node of the tree for the page is encoded into a vector using a first machine learning model. For example, the encoding can be performed by encoder 122 as depicted in FIG. 1, the value of each node of the tree can be the data indicated by each node, and the vector can be the vector representation of the data indicated by the node, as discussed with respect to FIG. 1.

In some embodiments, the first machine learning model comprises one or more of a BERT, a GPT-3, a GPT-4, or a Seq2Seq model, as discussed with respect to FIG. 1.

At 340, a plurality of pairs of vectors are sampled from the one or more trees for the one or more pages, wherein a given pair of vectors corresponds to values of nodes in a same tree. For example, the sampling can be performed by a sampler, such as sampler 124 as depicted in FIG. 1. A given pair of vectors can be a start node vector and its corresponding end node vector, as discussed with respect to FIG. 1.

In some embodiments, sampling the plurality of pairs of vectors from the one or more trees comprises identifying a given node in a given tree as a start node, performing a random walk based on the start node in the given tree, identifying an end of the random walk as an end node in the given tree, and paring the encoded vector of the start node with the encoded vector of the end node. For example, random walk can be performed by a sampler, such as sampler 124 as depicted in FIG. 1, to identify a start node and an end node. Pairing the encoded vector of the start node with the encoded vector of the end node can include designating the start node vector as the training data and the end node vector as the label, as discussed with respect to FIGS. 1-2.

At 350, a second machine learning model is trained using the plurality of pairs of vectors. For example, the training can be performed by a model trainer, such as model trainer 126 as depicted in FIG. 1. The plurality of pairs of vectors can include a set of vectors as the training data (e.g., the start node vectors) and another set of vectors as the corresponding labels (e.g., the end node vectors), as discussed with respect to FIGS. 1-2.

In some embodiments, the second machine learning model comprises a hidden layer, as discussed with respect to FIG. 1.

In some embodiments, training the second machine learning model is based on a cost or loss function between an input and a label, such as an L-2 loss (e.g., based on Euclidean distance), an L-1 loss (e.g., based on Manhattan distance), and/or the like.

At 360, each vector is combined with weights of the second machine learning model. For example, the weights of the second machine learning model can be structural information 130 as depicted in FIG. 1.

In some embodiments, combining each vector with weights of the second machine learning model comprises generating a dot product of the vector and the weights of the second machine learning model, or concatenating the vector with the weights of the second machine learning model, as discussed with respect to FIG. 1.

In some embodiments, a downstream machine learning task is performing using the combined vectors, as discussed with respect to FIG. 1. For example, a downstream task can be scraping data from a website, as discussed with respect to FIG. 1.

In some embodiments, the weights of the second machine learning model are used to automatically extract one or more values from additional electronic data, as discussed with respect to FIG. 1. For example, the additional electronic data can indicate additional documents whereas the one or more values can indicate hierarchical information of the additional documents.

Example Application Server

Figure 4:
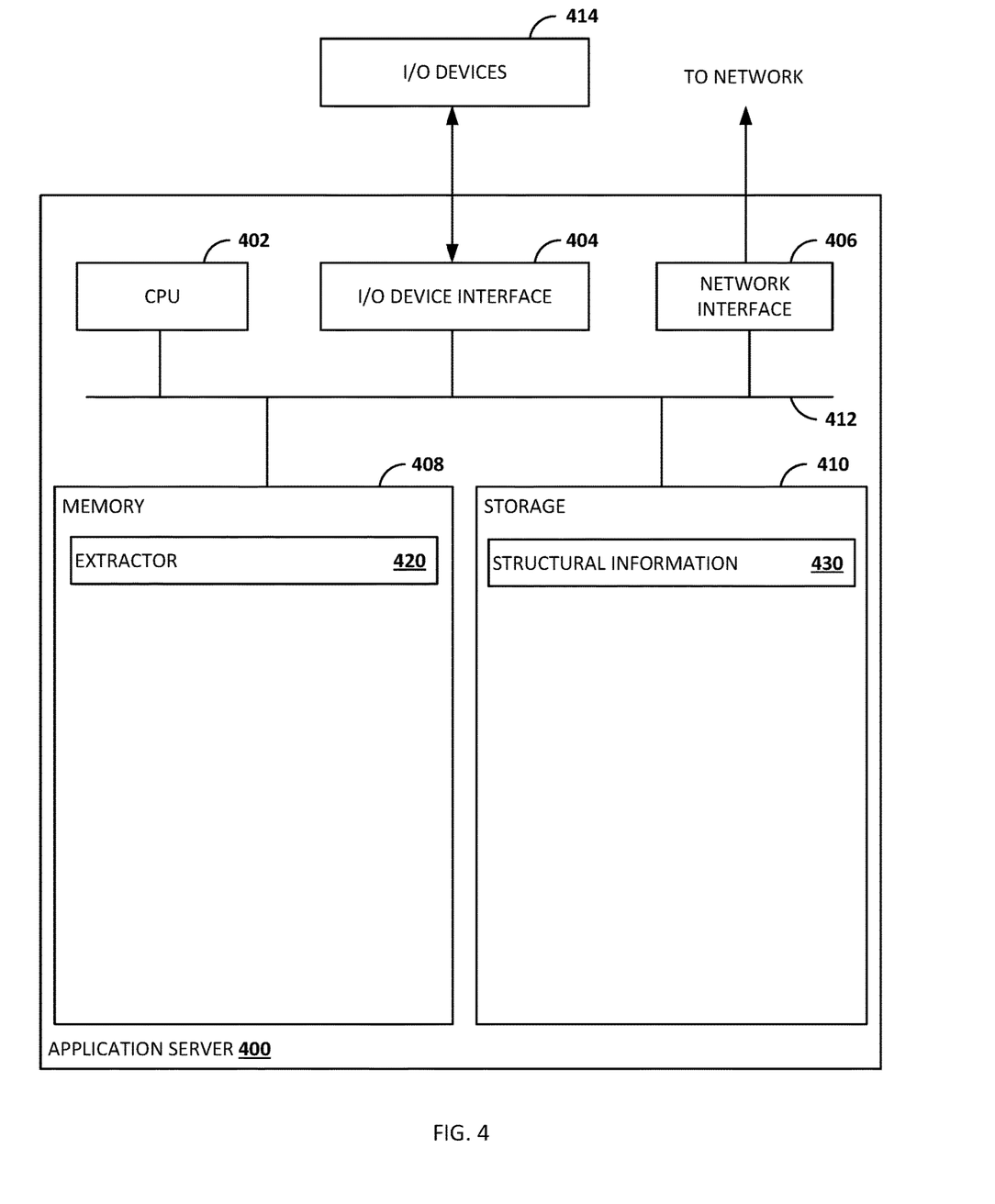
FIG. 4 depicts an example application server related to embodiments of the present disclosure.

FIG. 4 depicts an example application server 400, which can be used to deploy extractor 100 of FIG. 1. As shown, application server 400 includes a central processing unit (CPU) 402, one or more input/output (I/O) device interfaces 404, which may allow for the connection of various I/O devices 414 (e.g., keyboards, displays, mouse devices, pen input, etc.) to application server 400, a network interface 406, a memory 408, a storage 410, and an interconnect 412.

CPU 402 may retrieve and execute programming instructions stored in memory 408. Similarly, CPU 402 may retrieve and store application data residing in memory 408. Interconnect 412 transmits programming instructions and application data, among CPU 402, I/O device interface 404, network interface 406, memory 408, and storage 410. CPU 402 is included to be representative of a single CPU, multiple CPUs, a single CPU having multiple processing cores, and the like. I/O device interface 404 may provide an interface for capturing data from one or more input devices integrated into or connected to application server 400, such as keyboards, mice, touchscreens, and so on. Memory 408 may represent a random access memory (RAM), while storage 410 may be a solid state drive, for example. Although shown as a single unit, storage 410 may be a combination of fixed and/or removable storage devices, such as fixed drives, removable memory cards, network attached storage (NAS), or cloud-based storage.

As shown, memory 408 includes extractor 420. Extractor 420 may be the same as or substantially similar to extractor 100 of FIG. 1.

As shown, storage 410 includes structural information 430. Structural information 430 may be the same as or substantially similar to structural information 130 of FIG. 1.

It is noted that the components depicted in application server 400 are included as examples, and other types of computing components may be used to implement techniques described herein. For example, while memory 408 and storage 410 are depicted separately, components depicted within memory 408 and storage 410 may be stored in the same storage device or different storage devices associated with one or more computing devices.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A method, comprising:
receiving electronic data indicating one or more pages;
constructing, for each page of the one or more pages, a tree based on the page, wherein each level of the tree includes one or more nodes corresponding to elements in a level of elements in the page;
encoding, for each page of the one or more pages, a value of each node of the tree for the page into a vector using a first machine learning model;
sampling a plurality of pairs of vectors from the one or more trees for the one or more pages, wherein a given pair of vectors corresponds to values of nodes in a same tree;
training a second machine learning model using the plurality of pairs of vectors; and
combining each vector with weights of the second machine learning model.

2. The method of claim 1, further comprising performing a downstream machine learning task using the combined vectors.

3. The method of claim 1, wherein the first machine learning model comprises one or more of a Bidirectional Encoder Representations from Transformers (BERT), a Generative Pre-trained Transformer 3 (GPT-3), a Generative Pre-trained Transformer 4 (GPT-4), or a Sequence-to-Sequence (Seq2Seq).

4. The method of claim 1, wherein sampling the plurality of pairs of vectors from the one or more trees comprises:
identifying a given node in a given tree as a start node;
performing a random walk based on the start node in the given tree;
identifying an end of the random walk as an end node in the given tree; and
paring the encoded vector of the start node with the encoded vector of the end node.

5. The method of claim 1, wherein the second machine learning model comprises a hidden layer.

6. The method of claim 1, wherein training the second machine learning model is based on an L-2 loss between an input and a label.

7. The method of claim 1, wherein combining each vector with weights of the second machine learning model comprises:
generating a dot product of the vector and the weights of the second machine learning model; or
concatenating the vector with the weights of the second machine learning model.

8. The method of claim 1, wherein the one or more pages are HTMLs and the level of elements represents a division, a paragraph, or a field of the HTMLs.

9. The method of claim 1, further comprising using the weights of the second machine learning model to automatically extract one or more values from additional electronic data.

10. A system, comprising:
a memory including computer executable instructions; and
a processor configured to execute the computer-executable instructions and cause the system to:
receive electronic data indicating one or more pages;
constructing, for each page of the one or more pages, a tree based on the page, wherein each level of the tree includes one or more nodes corresponding to elements in a level of elements in the page;
encode, for each page of the one or more pages, a value of each node of the tree for the page into a vector using a first machine learning model;
sample a plurality of pairs of vectors from the one or more trees for the one or more pages, wherein a given pair of vectors corresponds to values of nodes in a same tree;
train a second machine learning model using the plurality of pairs of vectors; and
combine each vector with weights of the second machine learning model.

11. The system of claim 10, wherein the processor configured to execute the computer-executable instructions and cause the system to further perform a downstream machine learning task using the combined vectors.

12. The system of claim 10, wherein the first machine learning model comprises one or more of a Bidirectional Encoder Representations from Transformers (BERT), a Generative Pre-trained Transformer 3 (GPT-3), a Generative Pre-trained Transformer 4 (GPT-4), or a Sequence-to-Sequence (Seq2Seq).

13. The system of claim 10, wherein sampling the plurality of pairs of vectors from the one or more trees comprises:
identifying a given node in a given tree as a start node;
performing a random walk based on the start node in the given tree;
identifying an end of the random walk as an end node in the given tree; and
paring the encoded vector of the start node with the encoded vector of the end node.

14. The system of claim 10, wherein the second machine learning model comprises a hidden layer.

15. The system of claim 10, wherein training the second machine learning model is based on an L-2 loss between an input and a label.

16. The system of claim 10, wherein combining each vector with weights of the second machine learning model comprises:
generating a dot product of the vector and the weights of the second machine learning model; or
concatenating the vector with the weights of the second machine learning model.

17. The system of claim 10, wherein the one or more pages are HTMLs and the level of elements represents a division, a paragraph, or a field of the HTMLs.

18. The system of claim 10, further comprising using the weights of the second machine learning model to automatically extract one or more values from additional electronic data.

19. A non-transitory computer readable medium comprising instructions to be executed in a computer system, wherein the instructions when executed in the computer system perform a method on a computing device, comprising:
receiving electronic data indicating one or more pages;
constructing, for each page of the one or more pages, a tree based on the page, wherein each level of the tree includes one or more nodes corresponding to elements in a level of elements in the page;
encoding, for each page of the one or more pages, a value of each node of the tree for the page into a vector using a first machine learning model;

sampling a plurality of pairs of vectors from the one or more trees for the one or more pages, wherein a given pair of vectors corresponds to values of nodes in a same tree;

training a second machine learning model using the plurality of pairs of vectors; and combining each vector with weights of the second machine learning model.

20. The non-transitory computer readable medium of claim 19, wherein the method further comprises performing a downstream machine learning task using the combined vectors.

\* \* \* \* \*